United States Patent [19]

Feldle

[11] Patent Number: 5,446,464

[45] Date of Patent: Aug. 29, 1995

[54] TRANSCEIVER MODULE

[75] Inventor: Heinz-Peter Feldle, Senden/Wullenstetten, Germany

[73] Assignee: Deutsche Aerospace AG, Munich, Germany

[21] Appl. No.: 133,092

[22] PCT Filed: Jul. 8, 1992

[86] PCT No.: PCT/EP92/01536

§ 371 Date: Oct. 8, 1993

§ 102(e) Date: Oct. 8, 1993

[87] PCT Pub. No.: WO93/16396

PCT Pub. Date: Aug. 19, 1993

[30] Foreign Application Priority Data

Feb. 11, 1992 [DE] Germany .......................... 42 03 932.0

[51] Int. Cl.$^6$ ............................................ G01S 13/00
[52] U.S. Cl. ........................................ 342/175; 342/74; 342/374; 333/101; 333/104; 333/108; 333/109
[58] Field of Search ...................... 342/175, 74, 81, 89, 342/371, 373, 374; 333/101, 104, 107, 108, 109, 111

[56] References Cited

U.S. PATENT DOCUMENTS 4,701,724 10/1987 Martin .................................. 333/103

FOREIGN PATENT DOCUMENTS

88/00760 1/1988 WIPO .

OTHER PUBLICATIONS

Patent Abstracts of Japan; vol. 8, No. 176 (E-260), Aug. 14th, 1984 & JP,A,59070323 (Mitsubishi Denki KK), Apr. 20th, 1984.
GaAs IC Symposium Technical Digest 13; Oct. 1987, Portland, Oreg.; pp. 147-148, G. H. Nesbit et al., "Monolithic Transmit/receive switch for millimeter-wave application".
IGARSS '90, International Geoscience and Remote Sensing Symposium; May 20th, 1990, Md., pp. 2325-2328, XP146728; A. P. Luscombe "Internal Calibration of the Radarsat Synthetic Aperture Radar".

Primary Examiner—J. Woodrow Eldred
Attorney, Agent, or Firm—Spencer, Frank & Schneider

[57] ABSTRACT

A high frequency transceiver includes a transmit/receive switch which is coupled to a transmission path and to a receive path of the module. The transmit/receive switch includes a 3 dB directional coupler having first, second and third ports, and a decoupled port which is connected to the receive path. Two HF power amplifiers are connected to the first and second ports of the transmit/receive switch to form a balanced amplifier in the transmission path. An HF switch is connected to the first and second ports of the transmit receive switch for short-circuiting the HF output of the balanced amplifier. A switching device is connected to the HF switch and to the receive path for selectively switching the transmission path and the receive path to be operational.

8 Claims, 2 Drawing Sheets

TRANSCEIVER MODULE

BACKGROUND OF THE INVENTION

1. Field of the Invention

The invention relates to a transceiver module for the high frequency domain including at least a transmission path having an HF power amplifier, a receive path having a low-noise receiving amplifier, and a transmit/receive switch which permits switching from the transmit path to the receive path.

2. Description of the Related Art

In many high frequency applications, for example in the radar art, it is necessary to selectively couple a transmission path, which generally includes one or a plurality of high frequency (HF) power amplifiers, or a highly sensitive receiving path to a common transmit/receive path, for example a radar antenna. For this purpose a transmit/receive switch is employed which is also called a T/R switch or duplexer.

The radar art frequently employs a circulator for this purpose. Such a circulator has the drawback that it is mechanically sensitive, particularly to high accelerations, for example impact or shock, and additionally has an often insufficient, small operating temperature range. A circulator has a relatively large volume so that an often required small and lightweight structure, for example within the framework of an integrated structure, is not possible. If, for example, a radar system is intended to transmit and/or receive circularly polarized radiation, two circulators are required, which is a drawback, and they must additionally be arranged as far apart from one another as possible in order to prevent bothering magnetic couplings between them. Moreover, a circulator is an expensive component so that its use leads to disadvantageously high costs, particularly in phased array antennas.

As an alternative, it is possible to employ a so-called SPDT (single pole double throw) switch. A drawback with an SPDT switch is that it can be used only for small transmitting powers, that is, up to about 1 W, and moreover does not provide protection for the transmission path against unduly high reflected HF powers received, for example, by a radiator element.

SUMMARY OF THE INVENTION

It is therefore an object of the invention to provide an arrangement of this type which is particularly suitable for medium to high transmitting powers, is mechanically robust, has a small volume, and can be integrated on a (circuit carrier) substrate in a cost-effective manner.

This is accomplished with a transceiver module having a transmit/receive switch configured as a 3 dB directional coupler, with the receive path of the module being connected to a decoupled gate of the 3 dB directional coupler, wherein the transmission path of the module includes at least two HF power amplifiers which together with the transmit/receive switch constitute a balanced amplifier, an HF switch, which is used to short-circuit the HF output, disposed at each output of the HF power amplifiers, a switching means, provided with which the transmission path and the receive path, which can be selectively switched to be operational, and wherein the HF switches are coupled with the switching means. Advantageous embodiments and/or modifications are defined as follows.

A first advantage of the invention is that already tested HF components of favorable cost can be utilized so that cost-effective and reliable industrial fabrication becomes possible.

A second advantage is that good and stable transmit/receive characteristics are available over a large operating temperature range from, for example, −55° C. to +120° C.

A third advantage is that a transceiver module up to a transmitting power of, for example, 12 W can be integrated on a carrier substrate, such as a ceramic substrate, in such a small space and at such favorable cost that it can be used to manufacture in a cost-efficient manner particularly an antenna array that is mechanically robust, has a low weight, and may include up to several thousand individual phased radiators.

A fourth advantage is that the arrangement can be configured substantially with planar circuitry.

BRIEF DESCRIPTION OF THE DRAWINGS

Embodiments of the invention will now be described in greater detail with reference to schematic drawing figures, in which.

DETAILED DESCRIPTION OF THE PREFERRED EMBODIMENTS

The examples refer particularly to use in multi-function, active, phased antenna arrays, for example, for radar systems, operating in a frequency range from 5 to 6 GHz and 9.5 to 10.5 GHz, respectively, in which each individual radiator may have a transmitting power up to 10 W.

Figure 1:
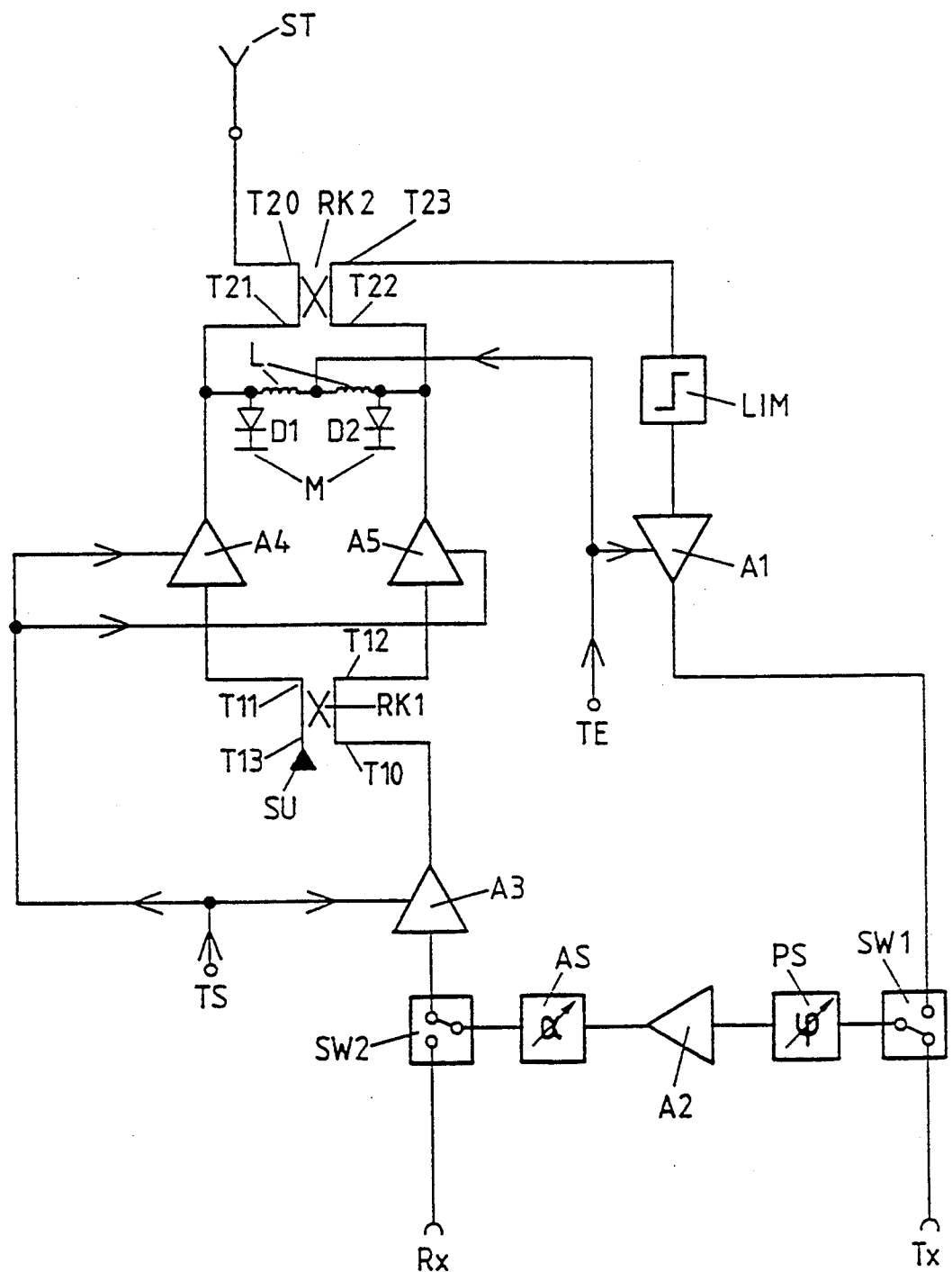
FIG. 1 shows a first embodiment of a transmit/receive module according to the present invention.

The embodiment according to FIG. 1 depicts a transceiver module (T/R module) composed of:
a common radiator path;
a transmit/receive switch essentially including: a second directional coupler RK2, HF switches D1, D2;
a transmitting path composed of an HF driver amplifier A3, a first directional coupler RK1, and HF power amplifiers A4, A5;
a receiving path composed of an amplitude limiter LIM as well as a low noise amplifier A1; and
a common control path, composed of transmit/receive switches SW1, SW2 and a series connection of a phase adjuster PS, a pre-amplifier A2 and an amplitude adjuster AS (amplitude attenuator) between the transmit/receive switches.

In the case of transmission (transmit mode) an HF transmission signal, e.g., a signal at 5 to 6 GHz, present at transmit input Tx travels through the first T/R switch SW1, control path PS, A2, AS, and the second T/R switch SW2, to the HF driver amplifier A3 which has, for example, an HF power of 3 W. Its output signal is fed to a first directional coupler RK1, which is a so-called 3 dB directional coupler, and thus splits the HF power arriving at gate, or port T10 in a ratio of 1:1 onto the two gates T11 and T12.

The directional behavior of such 90° directional couplers, e.g., the so-called longitudinal side directional couplers or the so-called Lange couplers can be adjusted by way of the spacing of coupled lines when a directional coupler gate is decoupled. Parasitic signals due to a possibly non-ideal manufacture of such directional couplers are converted by means of an HF sump SU, e.g., an ohmic resistor, into thermal energy (heat). The HF output signals present at gates T11, T12 have the same HF signal amplitudes (3 dB couplers) but are mutually shifted in phase by 90°. Each one of these signals is amplified in an HF power amplifier A4, A5, with these amplifiers having a maximum HF output power of, for example, 6 W. The HF output signals of the HF power amplifiers A4, A5 travel to a second 3 dB directional coupler RK2 which has a comparable configuration as that of the first 3 dB directional coupler RK1, are combined there and travel through gate T20 to a transmit/receive antenna, e.g., a waveguide radiator. The arrangement, composed of the 3 dB directional couplers RK1, RK2 and the HF power amplifiers, is advantageously configured as a so-called balanced amplifier, with both HF power amplifiers A4, A5 having the same gain and the same phase characteristics. Additionally, the outputs of amplifiers A4, A5 can be coupled to directional coupler RK2 by striplines.

In the receive mode, the HF receive signal received by radiator ST is fed to the second directional coupler RK2 by way of its gate T20 and coupled out again at gate T23 as will be described in greater detail below. Then the received HF signal travels through an amplitude limiter LIM, which protects, in particular, the subsequently connected low-noise amplifier A1 as well as the transmission path against destruction and overshooting, the amplifier A1, the first T/R switch SW1, the control path as well as the second T/R switch SW2, to the receiver output Rx.

To switch from the transmit mode to the receive mode, two HF switches D1, D2 are required which are advantageously configured as HF semiconductor diodes. One of these HF switches D1, D2 in each case is connected with an output of HF power amplifiers A4, A5. Thus, it is selectively possible to connect these outputs to HF ground so that an HF short circuit is created, also at gates T21, T22 of the second directional coupler RK2. This switching is effected by switching means TE, TS, for example two switchable direct voltage sources, and by two inductances L which prevent undesirable loss of HF power.

In the transmit mode, amplifiers A3, A4, A5 are switched on, e.g., in that their supply voltages are switched in with the aid of switching means TS, e.g., a switching voltage. At the same time, the further switching means TE, e.g., 0 V or a low, negative direct voltage (with respect to HF ground M), switch off the low-noise amplifier A1 and thus protect it while HF switches D1, D2 are switched into an "open" state, i.e., they have a high HF impedance (definable HF idling). The illustrated HF semiconductor diodes are blocked. No HF short circuit is present at gates T21, T22. Thus, an HF transmission signal is able to be transmitted, as described, by radiator ST. The inductances L here prevent an undesirable loss of HF power.

In the receive mode, the output signals of power amplifiers A4, A5, in particular, are switched off and, advisably, also the output signal of driver amplifier A3. This is done by switching means TS. The further switching means TE, e.g., a direct voltage that is positive with respect to HF ground M, switches on the low-noise amplifier A1 and switches HF switches D1, D2 into a "closed" state; that is, they have a low HF impedance and thus constitute a precisely definable HF short circuit. This short circuit is therefore advantageously independent of the output impedances of power amplifiers A4, A5 and their possibly undefined HF characteristics in the off state. An HF receiving signal received by radiator ST, which now acts as an antenna, now travels through gate T20 to the second directional coupler RK2. There this signal is divided 1:1 to gates T21, T22, since gate T23 is the decoupled gate of the 3 dB coupler. Both signal components, which have the same amplitude and a mutual 90° shift in phase, travel to the closed HF switches D1, D2 which form an HF short circuit. There both HF signals are totally reflected (r=−1) and return to the second directional coupler RK2 where they are constructively superposed in such a manner that they are essentially coupled out completely at gate T23 (receiving path). At gate T20 a destructive signal superposition (signal erasure) takes place so that the receiving signal can advantageously no longer be sent out again via radiator ST.

It is advisable to actuate T/R switches SW1, SW2 together with switching means TE, TS so that the former are also switched to the selected transmit or receive mode.

Figure 2:
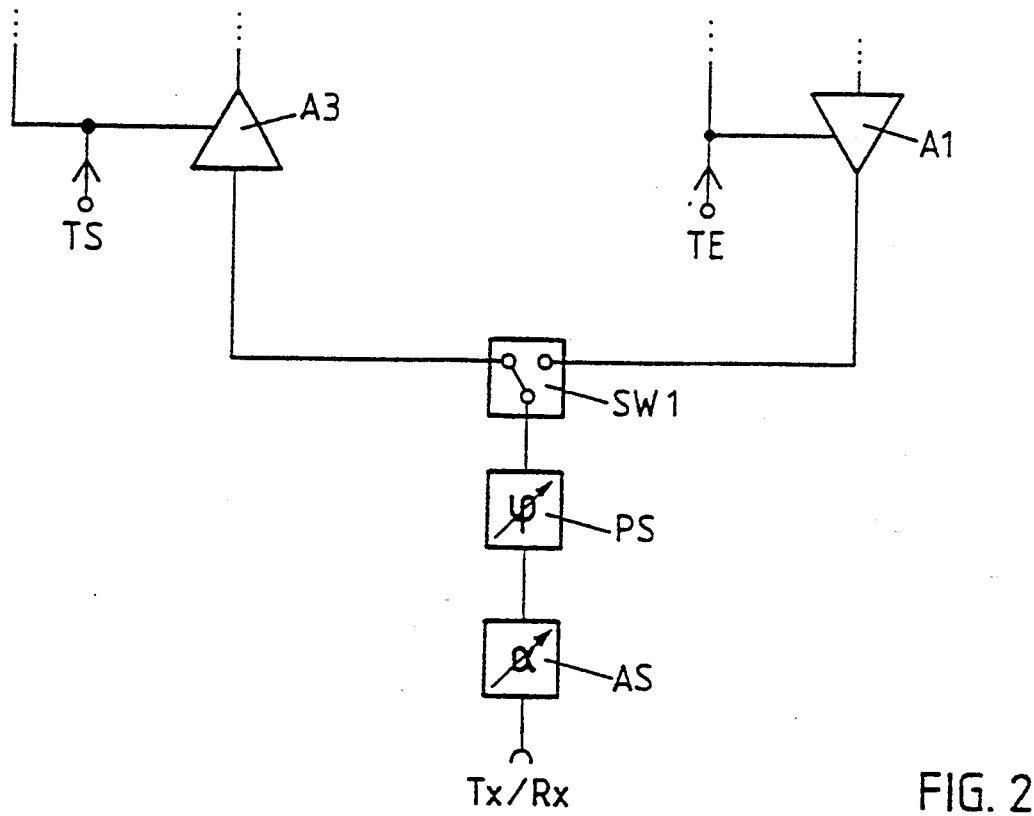
FIG. 2 shows a second embodiment of a transmit/receive module according to the present invention.

FIG. 2 depicts an embodiment that differs from that of FIG. 1 only in that only a single common transmit/receive port Tx/Rx is provided. The common control path, composed in this case only of an amplitude adjuster AS and a phase shifter PS, is connected to this port. Only one transmit/receive switch SW1 is required here.

Figure 3:
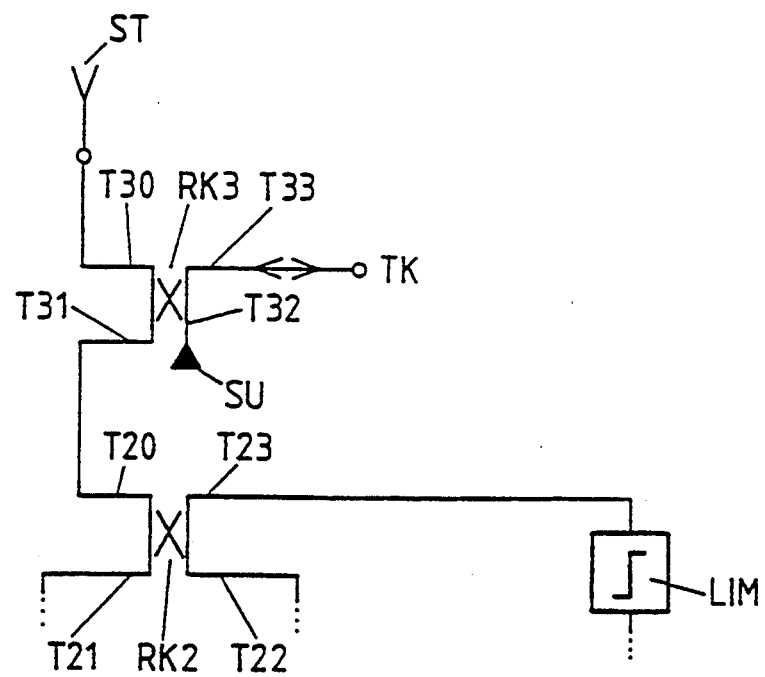
FIG. 3 shows a third embodiment of a transmit/receive module according to the present invention.

In the embodiments according to FIG. 1 or FIG. 2, it is additionally possible to arrange a third directional coupler RK3 between radiator ST and the second directional coupler RK2 in the common beam path according to FIG. 3. This third directional coupler RK3, which advantageously is configured as a so-called 30 dB coupler, serves for testing and/or calibrating the transceiver module. The gate T30 of the third directional coupler RK3 is coupled to radiator ST, gate T31 is connected with gate 20 (second directional coupler RK2) and gate T32 is terminated by an HF sump (ohmic resistor). An HF testing and/or calibrating signal can be coupled in and/or out at gate 33. Further, the directional couplers of the present invention can be formed using stripline technology.

The invention is not limited to the described embodiments but can be employed in the same sense for others. For example, it is possible to employ a 40 dB coupler or a 20 dB coupler for the third directional coupler RK3.

I claim:

1. A high frequency transceiver module comprising;
a transmit/receive switch coupled to a transmission path and to a receive path, the transmit/receive switch including a 3 dB directional coupler having first, second and third ports, and a decoupled port, the receive path being connected to the decoupled port;
at least two HF power amplifiers connected to the first and second ports of the 3 dB coupler to form a balanced amplifier in the transmission path, the balanced amplifier having an HF output;
an HF switch connected to the first and second ports of the 3 dB coupler for short-circuiting the HF output of the balanced amplifier; and
switching means connected to the HF switch and to the receive path for selectively switching the transmission path and the receive path to be operational.

2. A transceiver module according to claim 1, wherein the HF switch includes a semiconductor diode.

3. A transceiver module according to claim 1, wherein the HF switch includes at least one control terminal which is connected to the switching means, and the transceiver module further comprises at least one inductance is connected to the control terminal of the HF switch for preventing loss of HF power output from the balanced amplifier.

4. A transceiver module according to claim 1, further comprising a stripline connecting one output of the balanced amplifier to the HF switch, and wherein the HF switch includes at least one semiconductor diode.

5. A transceiver module according to claim 1, further comprising a radiator and an additional directional coupler disposed between the transmit/receive switch and the radiator.

6. A transceiver module according to claim 5, wherein the additional directional coupler is a 30 dB directional coupler for coupling in and/or out a test signal.

7. A transceiver module according to claim 5, wherein at least one of the directional couplers is comprised of stripline technology.

8. A transceiver module according to claim 1, wherein the transmit and receive paths carry radar signals.

* * * * *